Oct. 6, 1970  J. A. CLARK  3,533,056
SUBMERGED OBJECT VISUALIZER
Filed May 29, 1968
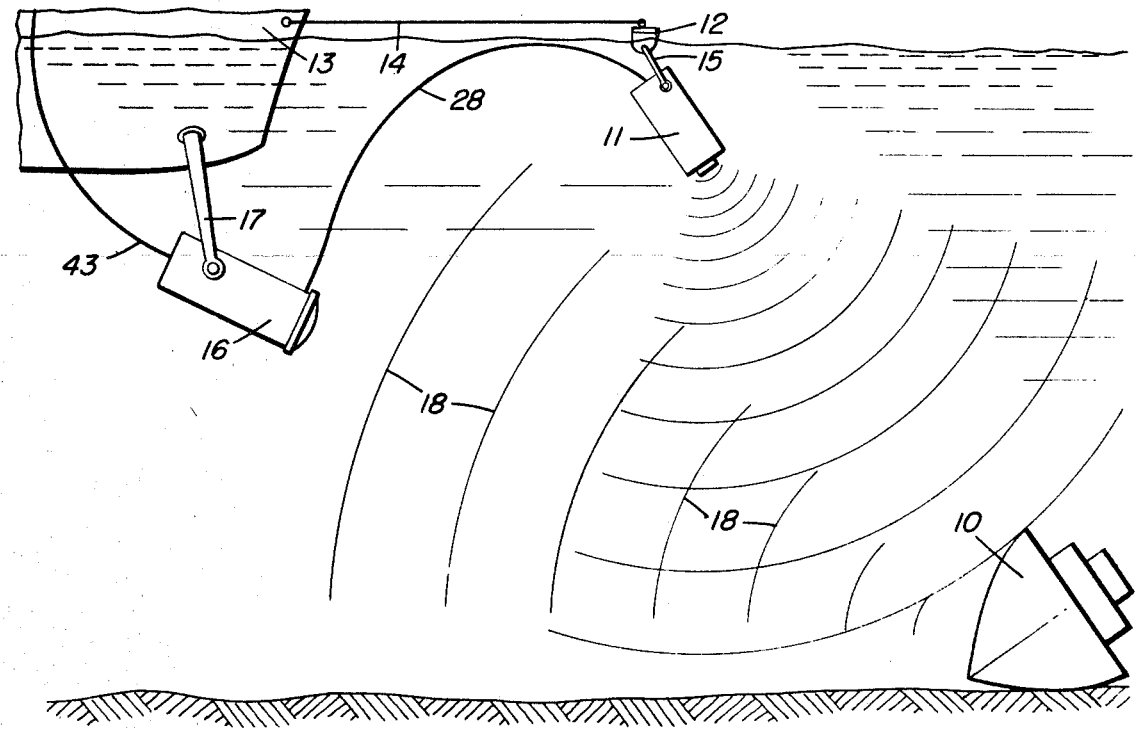
FIG. 1
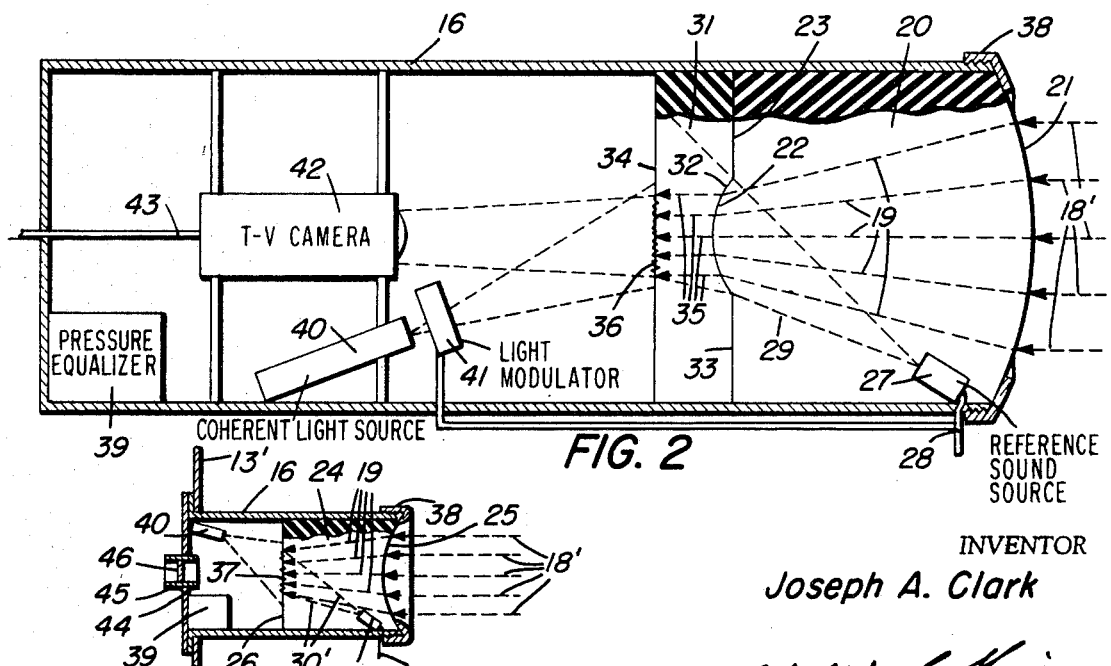
FIG. 2
FIG. 3
INVENTOR
Joseph A. Clark
BY
ATTORNEY

United States Patent Office 3,533,056
Patented Oct. 6, 1970

3,533,056
SUBMERGED OBJECT VISUALIZER
Joseph A. Clark, 1617 New Holland Pike,
Lancaster, Pa. 17601
Filed May 29, 1968, Ser. No. 733,162
Int. Cl. G01s 9/66
U.S. Cl. 340—3            10 Claims

ABSTRACT OF THE DISCLOSURE

A system and parts thereof for the detailed visualization of submerged objects and large regions of the ocean floor by insonifying the object or region by a main sound source, with an acoustic diffraction receiver in the form of a lens of deformable material, such as soft rubber, provided with a plane, light-reflective inner side, and having a reference source of sound coherent with the main sound source directed at the reflective lens surface through the lens at an acute angle to the central axis of the lens for forming an acoustic hologram of the insonified object of the lens reflective surface. A coherent light source in a pressurized air chamber in the receiver is directed at the light-reflective lens surface so as to produce a three-dimensional optical image of the object or region and thereby complete the acoustic-optical conversion of the image of the object or region. A television camera or an eye-piece is arranged to view the optical image, and respectively to generate and transmit conventional signals representing the optical image to a conventional receiver viewing screen or directly to look at the image through the eye-piece.

BACKGROUND OF THE INVENTION

This invention relates to visualization of underwater objects or large regions of the ocean floor by insonification of the object or region and a viewing thereof by an acoustic lens coupled to an acoustic-optical converter to produce an optical image which then is viewed directly through an eye-piece or displayed by suitable television equipment.

Ocean and other underwater exploration and searching of submerged areas and objects has become ever more active and demanding. Visualization of such areas has become increasingly essential to observers and operators of equipment in such activities as construction, salvage, rescue, drilling, and inspection. In order that such visualization have practical usefulness, it should provide a good resolution of an instantaneous perspective view of the situation being considered. The high turbidity of many underwater locations, especially near the ocean bottom, drastically limits viewing such areas with light illumination. Often the slightest disturbance of or contact with the sediment layer stirs up light impenetrable clouds of minute particles which substantially obscure optical visualization of the surroundings. This makes conventional light utilizing equipment practically useless for such activities.

Even without agitation, the sea contains suspended particles which scatter light. Because of this scattering, optical systems, such as underwater cameras, can observe only a hazy glow at distances greater than 25–30 feet, no matter how intense the light source may be. Often it is important to explore large regions of the ocean floor or to operate submarines at high speeds near the bottom. For both of these applications larger ranges of view are required.

Sound waves have been used for purely detection purposes or to determine the range and bearing of underwater objects as with sonar, and more recently, sound has been proposed for viewing at short ranges because of the much reduced effect thereon by underwater turbidity. Most reports of work in this field indicate that the visual images obtainable are quite coarse compared to conventional light visualization with television if the water is clear, although the objects are discernable far better than with light illumination of turbid areas and even when the latter is completely impossible. In these developments, the acoustic receiver generally uses some form of acoustic-pressure converter scanning system to change the sound received into a television type display.

Rigid plastic lenses have been used for the concentration of acoustic power. Their effectiveness has been limited however because sound waves do not travel through such lenses with a unique velocity and hence focusing is poor.

SUMMARY OF INVENTION

The present invention utilizes a main source of sound to insonify the area or object to be viewed and an improved receiver system, comprising an acoustic lens incorporated into an acoustic-optical holographic converter for producing optical images of the insonified obect, produces optical images which are viewed in some embodiments directly by the eye of an observer and in others by a suitable television camera which generates and transmits conventional signals for viewing on a conventional television type receiver screen.

An object of the present invention is to provide an improved system for viewing either with the eye or with a television camera and receiver, to a high degree of resolution, submerged objects at short ranges, say between 2–15 feet, as well as large regions of the ocean floor at intermediate ranges, for example between 25–100 feet.

A further object of this invention is the provision of means for receiving sound which has been diffracted by submerged objects or regions and converting the received diffraction patterns into optical images of the objects or regions.

Another object of this invention is the provision of an improved acoustic lens for underwater imaging systems.

A still further object of this invention is the provision of a novel acoustic-optical converter.

Still another object of this invention is an improved device for forming an acoustic hologram.

A yet further object of this invention is an acoustic-optical converter for directly changing an acoustic hologram into a visual image.

Further objects and advantages of this invention will become apparent from the following description referring to the accompanying drawings, and the features of novelty which characterize this invention will be pointed out with particularity in the claims appended to and forming a part of this specification.

In the drawing:

FIG. 1 illustrates an underwater visualization system embodying the present invention;

FIG. 2 is an enlarged, partial sectional view, of the receiver shown in FIG. 1; and FIG. 3 is a partial section view of a simplified acoustic lens and acoustic hologram producing member with an eye-piece for direct viewing of the image.

DESCRIPTION OF THE PREFERRED EMBODIMENTS

Referring to the drawing, an improved underwater object visualizing system is shown, wherein a submerged object 10 such as a sunken ship, is insonified by a main underwater source of sound comprising an insonifier 11.

This insonifier may comprise any suitable source for generating sound in water. Preferably, the sound waves are propagated at a single frequency and are emitted continuously or in short tonebursts or else are random "acoustic noise" signals of a limited frequency bandwidth. Suitable conventional units for this purpose are available on the open market, and may comprise an electrical signal generator and an electro-acoustic transducer of the piezoelectric or magneto-strictive material type. The preferred frequency range is between 300 kc. and 3000 kc., and within this range about 600 kc. for viewing objects at intermediate distances, or 1000 kc. for small distances, although this is not limiting in the present system.

The insonifier 11 may be supported in a variety of ways and be under direct aim control of an operator or might even be more or less supported by a floating buoy. The former type support could comprise any suitable position and orientation control mounting on a floating or submerged operating station, such as a surface ship or subsurface boat, with the insonifier 11 exposed to and submerged in the water. It also can be supported by a buoy type mounting member 12 secured to the operating station, such as a ship 13, by a suitable line 14. The buoy member preferably is provided with a controllable mounting arm 15 or similar mechanism, which can be operated by remote control from the operating station on the ship 13. The line 14 also preferably can be let out or drawn in to vary the position of the insonifier 11 relative to the ship 13.

The sound waves which reach the object 10 are scattered in all directions depending chiefly on the shape of the object, the material of which it is composed, and the wavelength of the incident sound waves. For very short wavelengths (high frequencies) the scattered sound radiation can be adequately described by classical concepts of reflected rays. At these wavelengths, however, water quickly absorbs the sound radiation. Also, suspended particles are very effective scatterers of sound at very high frequencies. At lower frequencies sound is able to propagate through water with less attenuation and is not effectively scattered by suspended particles. To determine the nature of the low frequency sound wave scattered by an object, diffraction effects must be considered. According to generally accepted principles of holography, the form of an object is completely characterized by its diffraction pattern, and images of the original object can be obtained from this diffraction pattern. The receiver described in these preferred embodiments operates on holographic principles of image formation and therefore its operation is best described by considering the diffraction pattern of the object which it receives.

The receiver, in general, comprises a receiving system mainly housed in a suitable container or casing 16 suitably supported by the ship 13 and preferably also mounted by a position and orientation control mechanism, such as by control mounting arms 17. In this manner, the receiver casing can be aimed in a desired direction and also this direction of aim may be known by the operator to assist in determining the location of the object viewed. This casing 16 can, of course, be mounted directly on the ship 13 as long as its sound receiving viewing end is exposed submerged in the water to receive the diffracted sound wave pattern directly through the water. Due to this submerged, or least partially immersed, condition of the receiver casing 16, it is made thoroughly waterproof.

The receiver system, shown in greater detail in FIG. 2, comprises a lens for reception and concentration of the acoustic diffraction pattern and may be in the form of a compound lens, as shown in FIG. 2, or a single element lens, as shown in FIG. 3. In either case the lens must be constructed so that the acoustic diffraction pattern of the viewed object propagates through it without distortion. This is best attained by the use of a lens formed of deformable homogeneous material. By deformable is meant that the Young's modulus of material is much less than the bulk modulus of water in the frequency range employed. By choosing materials with very low Young's modulus (e.g., 500–50 p.s.i.) only one mechanism for the propagation of acoustic vibrations will be excited by sound waves in water. The velocity of waves propagated by this mechanism is a function of the bulk modulus of the soft rubber which can be varied by proper selection of soft rubber resins or obvious modifications of the normal rubber curing process. Hence a unique sound velocity or acoustic index of refraction can be specified for lens and well focused images are obtainable.

A soft rubber, suitable for this type lens is a polyurethane resin mixed with a suitable hardener, sold under the trade name of Thiokol Solithane 113 and described in detail in the Thiokol Chemical Corporation Technical Bulletin UR–12 (1961), Trenton, N.J. This material is a polyurethane composition prepared from a toluene-di-isocyanate prepolymer and a curing agent such as ricinoleyl alcohol. A suitable method of preparation, as well as data verifying the low value of the dynamic Young's modulus required for low and intermediate frequency acoustic lenses is reported in an article "The Mechanical and Optical Characterization of a Solithane 113 Composition," Arenz, Ferguson, and Williams, April 1967, Experimental Mechanics, Soc. Experimental Stress Analysis, pp. 183–188, copyright 1967. This lens forms part of the acoustic-optical imaging system and preferably collects the acoustic diffraction wave pattern indicated by the waves 18, FIG. 1, and the arrows 18[1], FIGS. 2 and 3, and concentrates it by reducing the field and increasing the intensity thereof, as indicated by arrows 19, FIGS. 2 and 3.

In the FIG. 2 construction, this is achieved in a compound lens by forming the fornt surface of the lens as a convex lens having an index of refraction greater than that of water. In this compound lens, the outer lens element 20 perferably is a double convex lens having a front convex surface 21 and a relatively smaller rear convex surface 22 wth a surrounding plane surface 23. The inner lens element 31 is also made of a deformable material with the proper index of refraction or bulk modulus, such as soft rubber like a polyurethane resin mixed with a hardener. It has a front usrface 32 which is complementary with the rear surface 23 of lens 20 and fastened to it with an adhesive, such as a polyurethane resin based cement or vacuum grease. With this lens configuration, the index of refraction is chosen so that sound waves scattered from the object and concentrated by the outer lens element 20, propagate as parallel rays through the inner lens element 31 to the back surface of the lens which is a plane surface forming a free air-rubber interface 34.

In the simple single element lens of FIG. 3, the lens is shown as a plano-concave lens 24, with an outer front concave surface 25 and an inner rear plane surface 26. With such a lens, an intensified and concentrated acoustic diffraction pattern can be obtained directly on the inner lens surface 26 by forming the lens of a type of deformable material having an index of refraction less than that of water. This can be obtained by use of different proportions of hardener with the polyurethane resin. Of course, a similar single element plano-convex lens, having an outer water-engaging convex surface and an inner plane air interface can be used, where the index of refraction of the lens is greater than that of water, as in the lens element 20 of FIG. 2.

In all instances, the acoustic diffraction pattern of the object will tend to be reproduced as an intensified and concentrated, but otherwise undistorted acoustic diffraction pattern on the plane, free, air-rubber interface of an acoustic lens. In order to convert this acoustic diffraction pattern into an optical image, an improved acoustic-optical holographic converter is provided. This comprises the provision of a reference source 27 of sound coherent with sound transmitted by the insonifier 11. By coherent is meant that the sound wave transmitted by the reference source will interfere with the sound wave received from the viewed object. Such a coherent source is preferably obtained by connecting the electro-acoustic transducer in the reference source 27 through a delay circuit (not shown) and cable 28 to an electrical oscillator or noise generator in the insonifier 11. The delay circuit will delay the electrical signal a time interval equivalent to the time taken by sound waves in travelling from insonifier to object to receiver. A continuous loop tape recorder is a typical example of such a delay circuit.

This reference sound source 27 is mounted in a position so that the sound emitted thereby is directed at the inner plane, free, air-lens interfaces 34 and 26, respectively, of the compound lens 20-31 and of the simple lens 24, and through these lenses at an acute angle to the central axis of the lens, as indicated by the dotted lines 29 and 30, where it interferes with the concentrated acoustic diffraction pattern of the object. Sound waves are reflected by the air-rubber interface and this superposition of sound waves from the object and from the reference source as they reflect causes variations in displacement of the interfaces 34 and 26 both with time and with position as indicated by the wavy lines 36 and 37, respectively, which may be called acoustic holograms.

In all cases, the lenses are suitably fitted and secured in position in the housing 16 in water-tight relation, and a suitable retaining cap 38 may be provided further to secure them in position. In order to prevent distortion of the lenses by the ambient water pressure to which their outer surfaces are subjected, a suitable pressure equalizing device 39 of any conventional type preferably is arranged in the casing 16 so as to maintain the air pressure within the casing the same as the ambient water pressure on the outside of the casing.

The acoustic-optical holographic converter further comprises a small coherent visible or infra-red light source 40, such as a laser, mounted in the casing 16 and directed toward the plane, free, air-rubber interfaces 34 and 26 of the lenses 31 and 24, respectively. The coherent light from the source 40 is optionally beamed through a suitable light modulator 41, such as a Kerr or Pockels cell, for modulating the light from the coherent light source to illuminate the plane, free, air-rubber interface in substantial synchronization with the maximum displacement of the acoustic hologram on this surface. This is preferably accomplished by driving the light modulator by an electrical signal which is in phase with the signal to the reference sound source 27.

In order to produce an optical image by the foregoing system, the plane surfaces 34 and 26 of the respective lenses 31 and 24 are made highly light reflective in any suitable manner, as by vapor deposition of a very thin metal film onto the rubber surface or by the addition of a reflective pigment to the lens material which will form a light reflective surface on the air-lens interface. The variations in displacement of the mirror surface caused by the reflecting sound waves, in turn causes spatial variations in the phase of the coherent light from the source 40 when it is reflected at the surface and hence acts as an optical hologram. In this manner, a virtual image, which appears to be behind the reflective surface, is produced by diffraction of the light at the hologram and can be viewed on a television screen or directly by looking at the reflective surface if the lens surface can be visually observed through a suitable transparent window.

The visualization system may include a suitable conventional television camera 42, as shown in FIG. 2, mounted in the casing 16 and aimed at the reflective surface for viewing the optical image and generating and transmitting conventional signals, representing the optical image, in any suitable manner, as by cable 43, to the operating station on the ship, where it can be easily viewed on a conventional television screen.

Alternatively, the image may be viewed directly by a construction as shown in FIG. 3, wherein the casing 16 is rigidly secured to the side 13' of the ship 13 and is sealed by an end plate 44 on which an eye-piece 45 is mounted. This eye-piece may comprise a simple clear glass non-refracting lens 46 through which a viewer can look directly at the air-rubber reflecting interface 26 to see the virtual image of the insonified object or area.

While particular embodiments of this invehtion have been illustrated and described, modifications thereof will occur to those skilled in the art. It is to be understood, therefore, that this invention is not to be limited to the exact details disclosed.

The invention claimed is:

1. A system for the visualization of objects in water and large regions of the ocean floor comprising a main underwater source of sound, a receiving system including a gas-filled water-tight container, a lens of deformable material of refractive index different from that of water mounted in said container for viewing in the driection insonified by said main sound source and having a face exposed to the water and an inner gas-lens interface in said container, said gas-lens interface being a light reflective surface, means including a reference source of sound coherent with said main sound source and directed at said lens reflective surface through said lens at an acute angle to the central axis of the lens for forming an acoustic hologram on said lens reflective surface, means for forming a three-dimensional optical image including a coherent light source in said container directed toward said lens reflective surface through the gas in said container, and means for viewing said image.

2. A system as defined in claim 1 wherein a pressure regulating means automatically maintains the pressure within said container at a predetermined value relative to the water pressure surrounding said container.

3. A system as defined in claim 1 wherein said lens is formed of a soft rubber material.

4. A system as defined in claim 1 having a light modulator mounted in said container so as to modulate light from said coherent light source to illuminate said lens reflective surface in substantial synchronization with maximum displacements of the acoustic hologram on said light reflective surface.

5. A system as defined in claim 1 wherein said means for viewing the image comprises a television camera for generating and transmitting conventional signals representing the optical image.

6. A system as defined in claim 1 wherein said means for viewing the image comprises a window in said container facing said reflective surface on the light source side thereof.

7. A system as defined in claim 1 wherein said lens is a convex lens having a net refractive index greater than water for reducing the field and increasing the intensity of the diffraction sound pattern received by the lens from an object insonified by said main sound source.

8. A system as defined in claim 1 including a gas pressure regulating means for maintaining a desired pressure in said container.

9. A system as defined in claim 1 wherein said lens is a concave lens having a refractive index less than water for reducing the field and increasing the intensity of the diffraction sound pattern received by the lens of an insonified object.

10. A system as defined in claim 1 wherein said light-reflective gas-lens interface is a substantially plane surface.

References Cited

UNITED STATES PATENTS 2,031,884  2/1936  Gray.
3,199,069  8/1965  Lord et al. _____ 340—1

FOREIGN PATENTS 1,479,712  3/1967  France.

OTHER REFERENCES

Fishlock: New Scientist, December 1966, p. 562.
Preston et al.: Applied Physics Letters, Mar. 1, 1967, pp. 150–152.
Young et al.: Applied Physics Letters, Nov. 1, 1967, pp. 294–296.

RICHARD A. FARLEY, Primary Examiner

U.S. Cl. X.R.

181—.5; 340—5, 8; 350—3.5